United States Patent
Quertelet et al.

(10) Patent No.: US 8,177,172 B2
(45) Date of Patent: May 15, 2012

(54) WIRE-TYPE CABLE RACEWAY, ESPECIALLY A CABLE RACEWAY FOR HOME USE

(75) Inventors: Stéphane Quertelet, Remy (FR); Sébastien Delcourt, Compiegne (FR)

(73) Assignee: I.C. M. Group, Montbard (FR)

( * ) Notice: Subject to any disclaimer, the term of this patent is extended or adjusted under 35 U.S.C. 154(b) by 86 days.

(21) Appl. No.: 12/097,262

(22) PCT Filed: Dec. 8, 2006

(86) PCT No.: PCT/FR2006/002687
§ 371 (c)(1),
(2), (4) Date: Nov. 5, 2008

(87) PCT Pub. No.: WO2007/068813
PCT Pub. Date: Jun. 21, 2007

(65) Prior Publication Data
US 2009/0166083 A1    Jul. 2, 2009

(30) Foreign Application Priority Data
Dec. 13, 2005   (FR) ..................................... 05 12570

(51) Int. Cl.
*F16L 3/22*    (2006.01)
(52) U.S. Cl. ........................ 248/68.1; 248/73; 211/187
(58) Field of Classification Search .................... 248/49, 248/65, 68.1, 53, 58, 918
See application file for complete search history.

(56) References Cited

U.S. PATENT DOCUMENTS

| | | | | |
|---|---|---|---|---|
| 5,062,605 A | * | 11/1991 | Muhlethaler | 248/68.1 |
| 5,384,937 A | * | 1/1995 | Simon | 24/295 |
| 5,531,410 A | * | 7/1996 | Simon | 248/49 |
| 5,723,819 A | | 3/1998 | Kirma et al. | |
| 5,893,539 A | * | 4/1999 | Tran et al. | 248/68.1 |

(Continued)

FOREIGN PATENT DOCUMENTS
DE   297 23 610 U1   12/1998
(Continued)

OTHER PUBLICATIONS

Russian Office Action, received Aug. 4, 2011.

*Primary Examiner* — Nkeisha Smith
(74) *Attorney, Agent, or Firm* — Young & Thompson

(57) ABSTRACT

A cable raceway of this kind consists of lengths of wire-type cable raceway comprising both essentially rectilinear lengthwise or weft wires (2) and polygonal-shaped transverse or warp wires (4), with an opening formed in a corner and an even number of sides. Each length comprises at least four lengthwise weft wires (2) supported by at least four separate sides (6, 8, 10, 12) of the transverse or warp wires. For each lengthwise weft wire (2) there is a lengthwise weft wire (2) on the opposite side. The two corresponding lengthwise or weft wires (2) are located opposite each other, that is to say they are both in the same plane and the plane is approximately parallel to one of the lengthwise faces of the cable raceway.

15 Claims, 6 Drawing Sheets

U.S. PATENT DOCUMENTS

Figure 1:
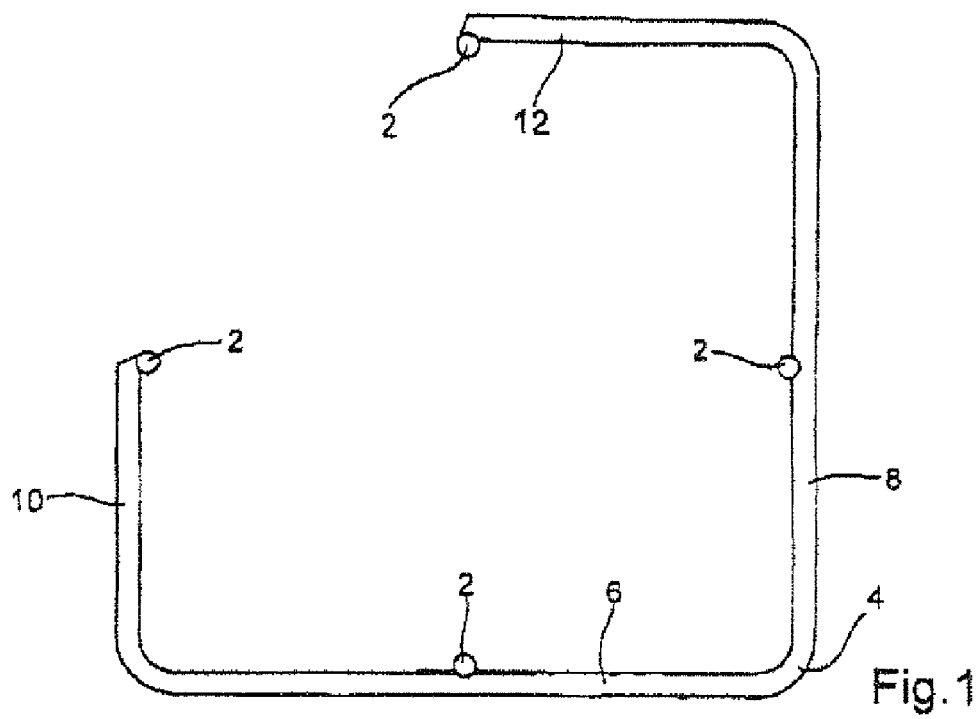

| | | | | |
|---|---|---|---|---|
| 5,927,658 A * | 7/1999 | Gerster | | 248/49 |
| 6,019,323 A * | 2/2000 | Jette | | 248/49 |
| 6,138,961 A * | 10/2000 | Zweig | | 248/68.1 |
| 6,247,871 B1 * | 6/2001 | Nickel et al. | | 403/396 |
| 6,361,000 B1 * | 3/2002 | Jette | | 248/49 |
| 6,402,418 B1 * | 6/2002 | Durin et al. | | 403/329 |
| 6,637,704 B2 * | 10/2003 | Jette | | 248/49 |
| 6,855,884 B2 * | 2/2005 | Spagnoli et al. | | 174/507 |
| 6,946,605 B2 * | 9/2005 | Levesque et al. | | 174/100 |
| 7,026,553 B2 * | 4/2006 | Levesque et al. | | 174/100 |
| 7,546,987 B2 * | 6/2009 | Sinkoff | | 248/68.1 |
| 7,597,203 B2 * | 10/2009 | Jasniy | | 211/119 |
| 2002/0030143 A1 * | 3/2002 | Jette | | 248/49 |
| 2004/0056157 A1 * | 3/2004 | Dufourg | | 248/68.1 |
| 2004/0144898 A1 * | 7/2004 | Spagnoli | | 248/68.1 |
| 2004/0245411 A1 * | 12/2004 | Phelan et al. | | 248/49 |
| 2005/0063775 A1 | 3/2005 | Boltz | | |
| 2009/0008512 A1 * | 1/2009 | Davis et al. | | 248/49 |

FOREIGN PATENT DOCUMENTS

| | | |
|---|---|---|
| DE | 199 46 388 A1 | 3/2001 |
| EP | 0 355 081 A2 | 2/1990 |
| FR | 2833420 A1 | 6/2003 |
| RU | 2134008 C1 | 7/1999 |
| RU | 2233522 C2 | 7/2004 |
| SU | 1424091 A1 | 9/1988 |
| SU | 1829077 A1 | 7/1993 |

* cited by examiner

WIRE-TYPE CABLE RACEWAY, ESPECIALLY A CABLE RACEWAY FOR HOME USE

The present invention concerns a wire-type cable raceway, especially a cable raceway for home use.

A wire cable raceway generally has an elongate shape and a U-shaped cross-section. It includes longitudinal wires, also called warp wires, and transverse wires, also called weft wires. As a general rule, the warp wires are rectilinear and the weft wires are U-shaped. All these wires are welded to each other so that they are regularly spaced. This kind of wire cable raceway, having a mesh structure, includes a bottom intended to support electrical cables (or the like) and lateral walls, or flanges, intended to retain the electrical cables on the bottom by forming a trough.

It is also known to produce cable raceways whose weft wires have a so-called G-shape. One such cable raceway is disclosed in the document ES-0 355 081, for example.

So-called G-shaped cable raceways generally necessitate the use of a dedicated part for fixing them to a support (floor, wall or ceiling). Furthermore, given in particular the configuration of the warp wires, it is difficult with prior art G-section wire cable raceways to effect a change of direction, whether this entails producing a bend in a vertical plane or in a horizontal plane.

An object of the present invention is therefore to provide a G-section wire cable raceway with which a change of direction is easy to produce. Following a change of direction, the cable raceway preferably retains high stiffness. This cable raceway can also be fixed to a support (floor, wall or ceiling), preferably using existing accessories. This kind of cable raceway is preferably suited to home use.

To this end, the invention proposes a wire cable raceway element including substantially rectilinear longitudinal warp wires and polygonal transverse weft wires, having an opening at one corner and an even number of sides.

According to the invention, this kind of cable raceway element includes at least four longitudinal warp wires carried by at least four different sides of the transverse weft wires, and to each longitudinal warp wire there corresponds a longitudinal warp wire on an opposite side, the two corresponding longitudinal warp wires being disposed face to face, i.e. in the same plane substantially parallel to one of the longitudinal faces of the cable raceway element.

Providing longitudinal wires on four longitudinal faces of the cable raceway element and the fact that each longitudinal wire of a longitudinal face of the cable raceway element is on the side opposite a facing longitudinal wire facilitates a change of direction in the cable raceway produced using the cable raceway element, at the same time as retaining high stiffness. To produce a bend in a cable raceway element of the invention, it is necessary to cut the longitudinal wires between two successive transverse wires except for the two wires corresponding to the required bending plane. A bend can then easily be formed that retains a connection between the two portions of the element consisting of the two longitudinal wires that are not cut. This preserves sufficient stiffness at the bend. This embodiment with four (or more) longitudinal wires is well suited to producing cable raceways with small dimensions that can also be used in applications in the home.

In one preferred embodiment yielding improved stiffness of the cable raceway and improved retention of cables in the cable raceway, a longitudinal warp wire is disposed on each of the longitudinal faces of the cable raceway element.

For reasons of symmetry and therefore of convenience in use, the longitudinal warp wires preferably lie in median longitudinal planes of the cable raceway element.

To prevent the ends corresponding to an edge of the opening produced in the transverse weft wires forming a hazardous projection, a longitudinal warp wire advantageously joins the free edges of the transverse weft wires corresponding to one edge of the opening formed therein.

For improved fixing of a wire cable raceway element of the invention to a wall, so that it is pressed against it, the longitudinal warp wires are advantageously inside the transverse weft wires.

One particular embodiment of a wire cable raceway element of the invention can have a substantially square cross section.

A cable raceway element of the invention has a substantially rectangular, where appropriate square, cross section, for example. This is the simplest shape of a cable raceway element of the invention. This kind of element then has transverse weft wires with four sides, for example. To each of those sides there then corresponds a longitudinal face of the cable raceway element. In one embodiment, these four faces are:

a bottom, a first lateral flange attached to a first longitudinal edge of the bottom, an upper rim narrower than and substantially parallel to the bottom extending from the edge of the first lateral flange opposite the bottom, and a second lateral flange lower than and substantially parallel to the first lateral flange and extending from the edge of the bottom opposite the first lateral flange.

In a different embodiment of this kind of cable raceway element, the height of the second lateral flange substantially corresponds to half the height of the first lateral flange, and the width of the upper rim corresponds substantially to half the width of the bottom of the cable raceway element.

Figure 2:
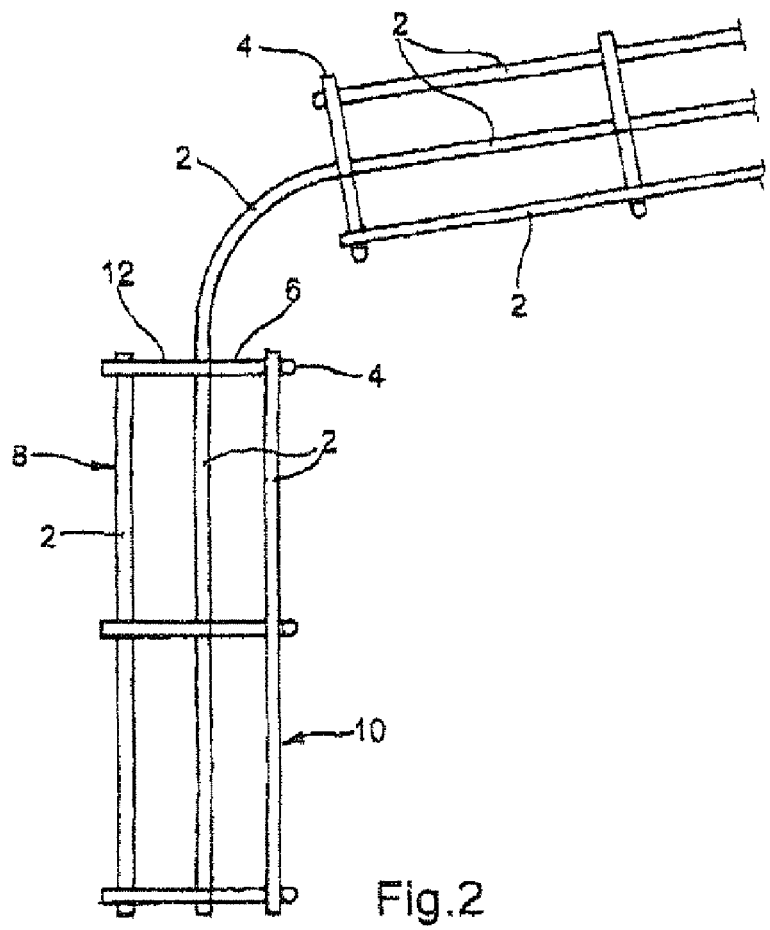
Figure 3:
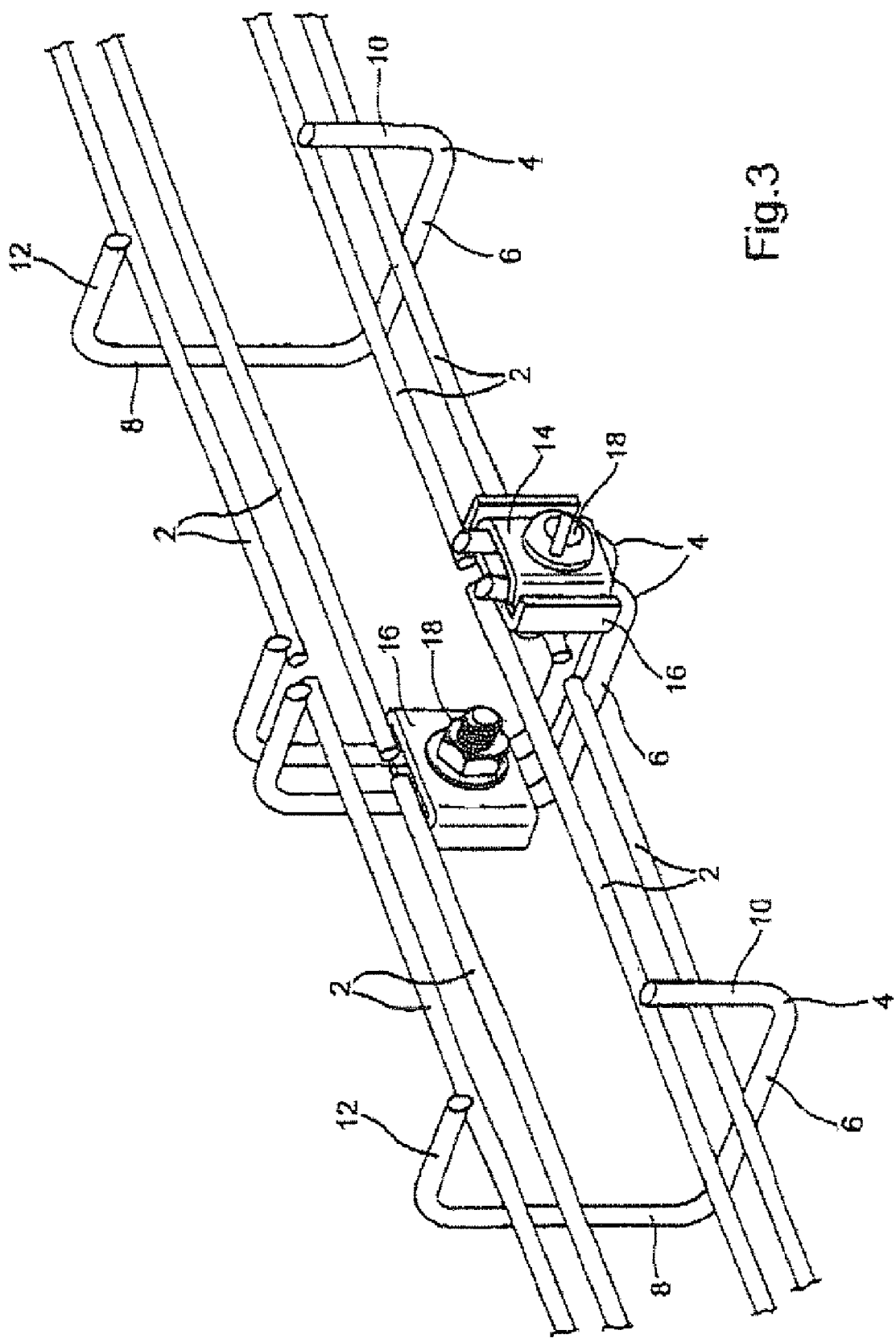
Figure 4:
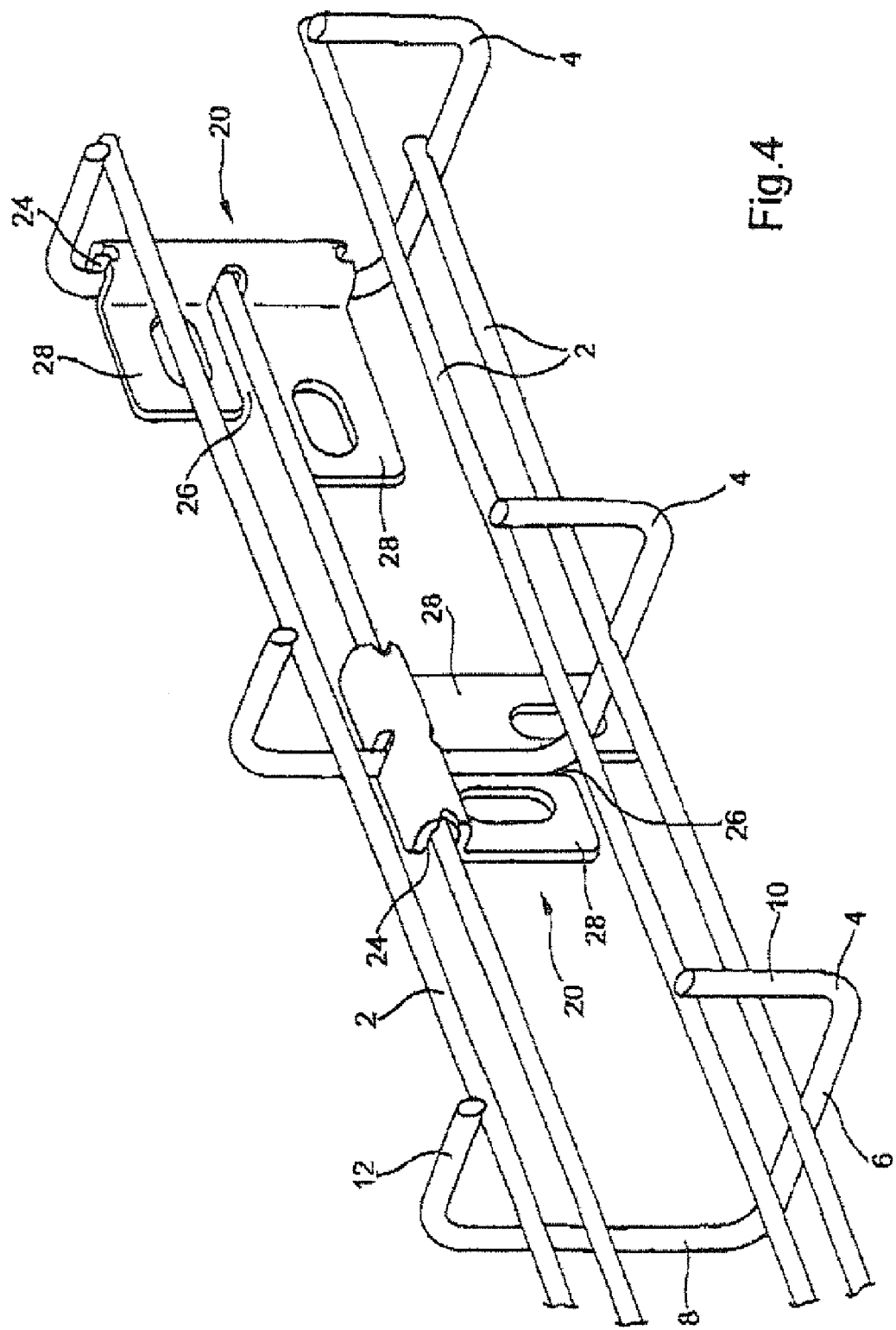
Figure 5:
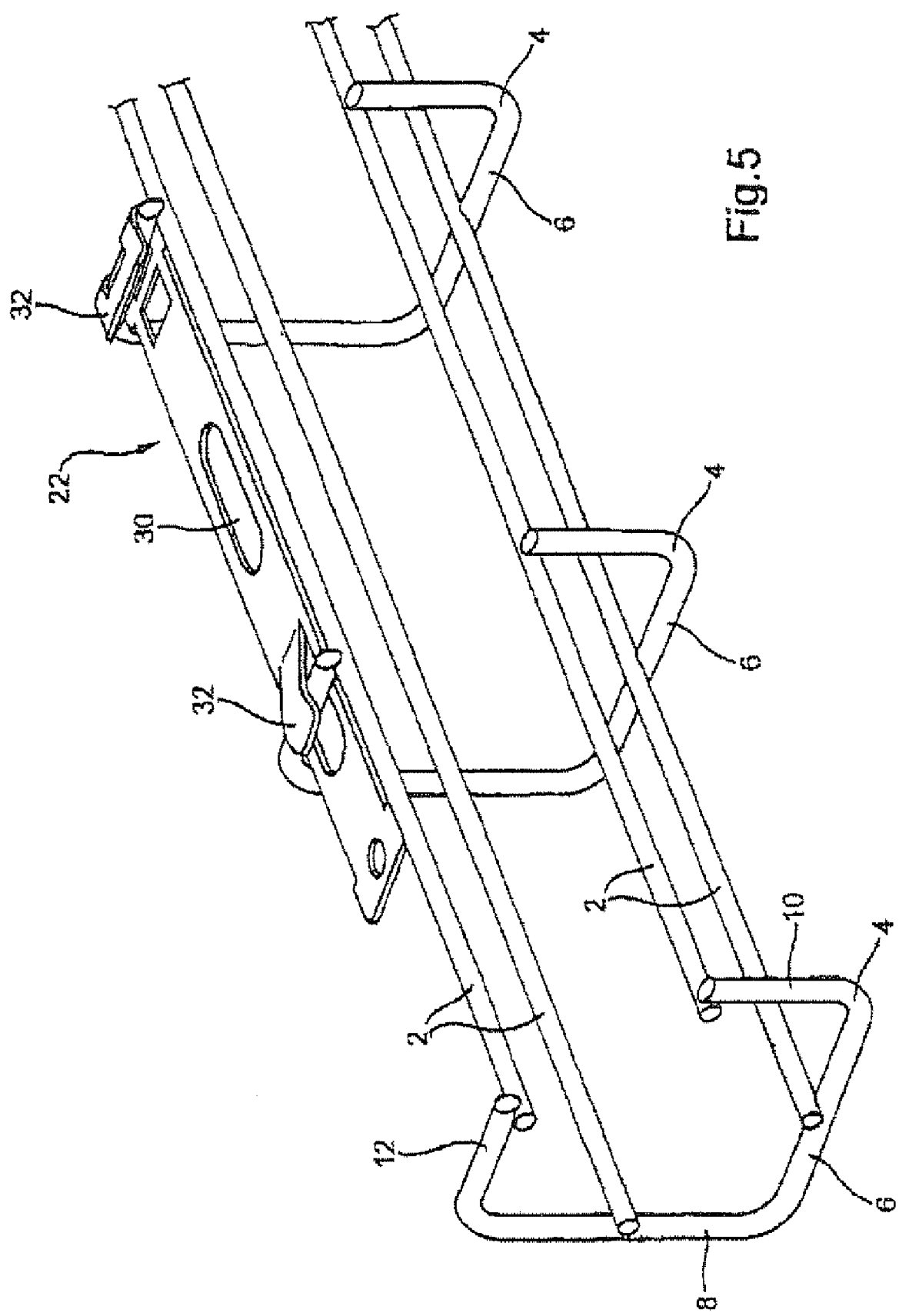
Figure 6:
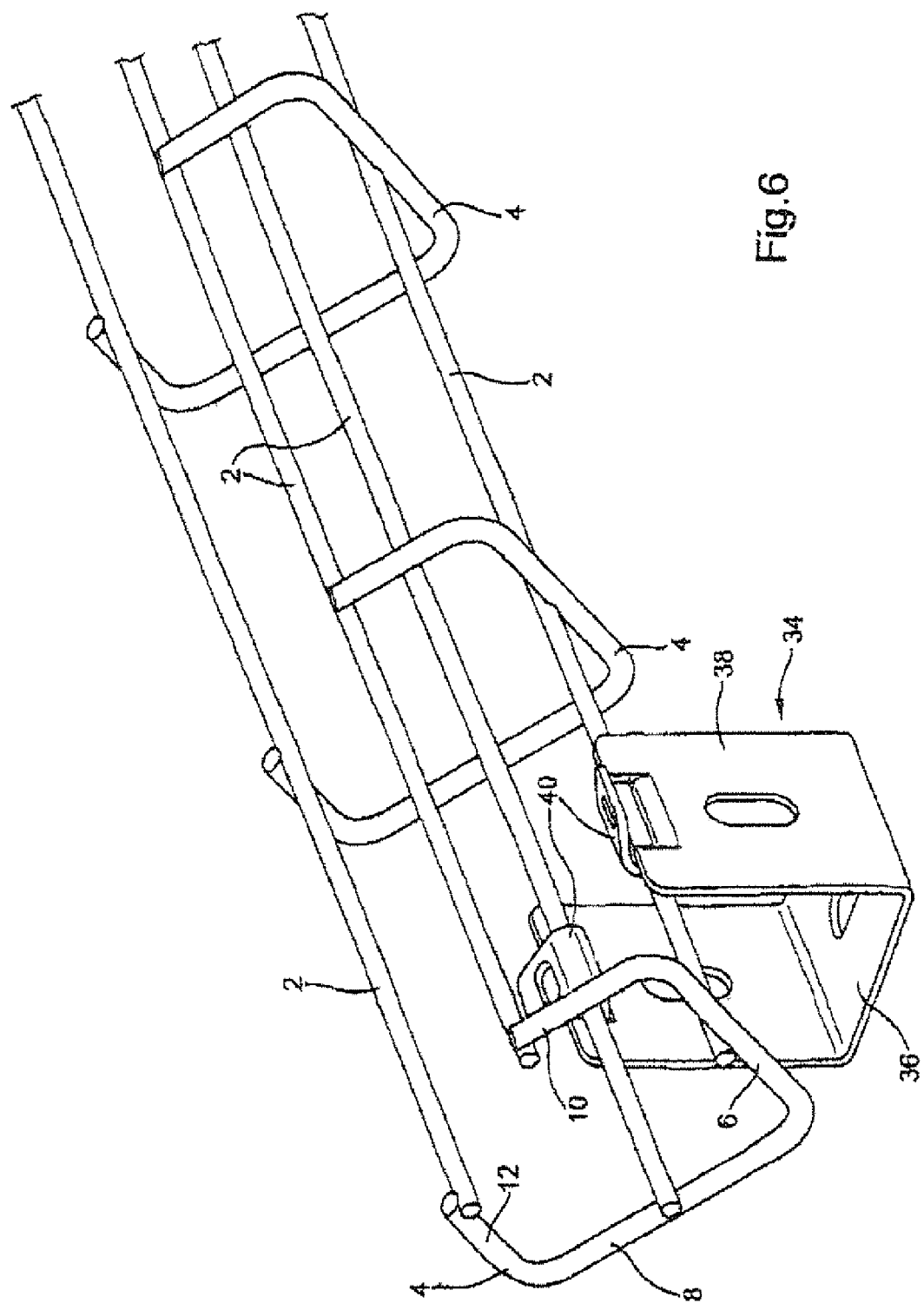
Figure 7:
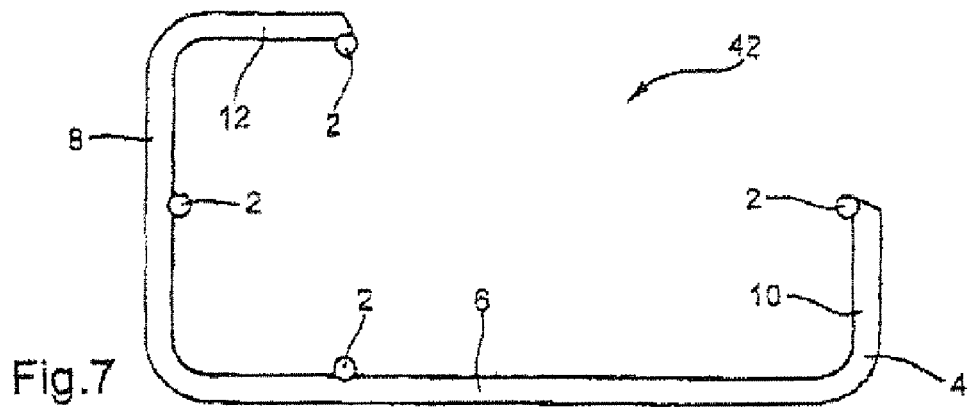
Figure 8:
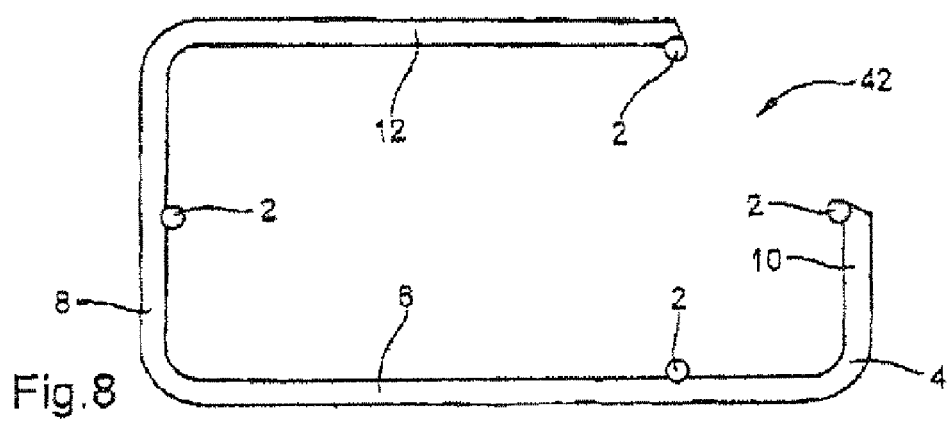
Figure 9:
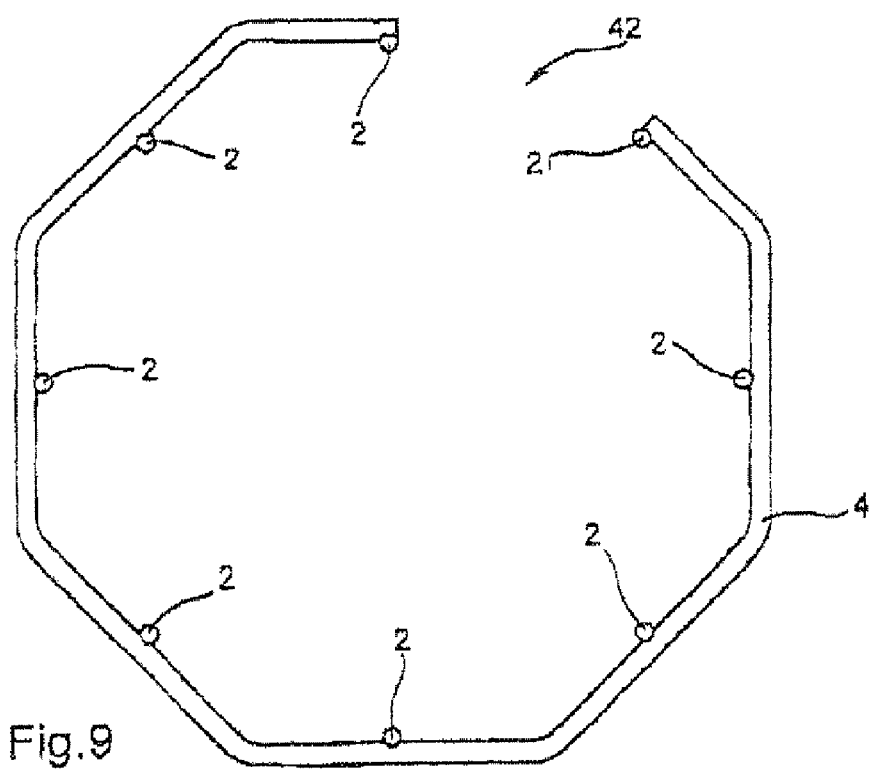

Details and advantages of the present invention will emerge more clearly from the following description with reference to the appended diagrammatic drawings, in which:

FIG. 1 is a large-scale front view of a cable raceway element of the invention, FIG. 2 is a plan view of a cable raceway element of the invention forming a bend, FIG. 3 shows how two cable raceway elements of the invention are spliced, FIG. 4 shows how a cable raceway according to the invention is fixed to a floor, wall or ceiling, FIG. 5 shows one way of suspending a cable raceway of the invention from a ceiling, FIG. 6 shows another way of fixing a cable raceway of the invention to a wall, floor or ceiling, and FIGS. 7, 8 and 9 are views corresponding to FIG. 1 for different embodiments of a cable raceway element of the invention.

The cable raceway elements represented in the drawings include wires of two different types forming a mesh, as is familiar to the person skilled in the art. Thus there are longitudinal wires 2 that extend in a rectilinear or substantially rectilinear manner the entire length of a cable raceway element (before any deformation thereof, of course) and transverse wires 4 disposed along the longitudinal wires 2 with a regular pitch. The longitudinal wires 2 are generally called warp wires 2 and the transverse wires 4 are generally called weft wires 4.

In most cable raceways, the transverse wires are U-shaped. In the present invention, these transverse wires 4 have a so-called G-shape. Thus these transverse wires 4 have the shape of a polygon from which one corner has been removed. The FIG. 1 cable raceway element corresponds to one particular embodiment. The polygon selected here is a polygon with four sides, and more specifically a square. The element represented therefore includes, firstly, a bottom 6. It also includes a first lateral flange 8, a second lateral flange 10, and a rim 12. The first lateral flange 8 extends from one longitudinal edge of the bottom 6 the full height and the entire length of the cable raceway element. The first lateral flange 8 opposite the bottom 6 carries the rim 12. The latter extends substantially parallel to the bottom 6 and, relative to the first lateral flange 8, is on the same side as the bottom 6. The width of this rim 12 is less than the width of the bottom 6.

The second lateral flange 10 extends parallel to the first lateral flange 8 from the second longitudinal edge of the bottom 5. This second lateral flange 10 extends over only a portion of the height of the cable raceway element.

In the particular embodiment represented in FIGS. 1 to 6, the transverse wires 4 have a square basic shape from which the top left-hand quarter has been removed (the top/bottom and right/left orientation relating to FIG. 1). Accordingly, the rim 12 of the cable raceway elements represented in FIGS. 1 to 6 has a width substantially corresponding to half the width of the bottom 6 and the height of the second lateral flange 10 substantially corresponds to half the height of the first lateral flange 8.

As can be seen in FIGS. 1 to 6, the cable raceway elements represented have four longitudinal wires 2. Each longitudinal face of the cable raceway therefore receives one longitudinal wire 2. A first longitudinal wire joins the free ends of the transverse wires 4 of the second lateral flange of the cable raceway. Facing this first longitudinal wire 2 is a second longitudinal wire disposed at the mid-height of the first lateral flange. These first two longitudinal wires 2 are therefore in a plane substantially parallel to the bottom 6 of the cable raceway element. In the particular embodiment represented in FIGS. 1 to 6, the plane containing the first two longitudinal wires 2 is a median plane of the cable raceway element.

A third longitudinal wire 2 joins the free ends of the rims 12 of the cable raceway element. Opposite this third longitudinal wire 2, facing it, is a fourth longitudinal wire 2 at the middle of the bottom 6. Thus the third and fourth longitudinal wires 2 are in a plane substantially parallel to the first and second lateral flanges of the cable raceway element. In the situation represented in FIGS. 1 to 6, this plane is also a median plane of the cable raceway element.

FIG. 2 shows how this kind of cable raceway element can be used to form a bend. FIG. 2 shows a cable raceway element from above. To produce the bend represented in this figure, an operator has cut two sections of longitudinal wires 2 disposed face to face between two successive transverse wires 4. In FIG. 2, the bend is produced by cutting, between two transverse wires 4, sections of longitudinal wires 2 welded to the lateral flanges 8, 10 of the cable raceway element. FIG. 2 therefore represents a cable raceway bent in a plane parallel to the plane of the bottom 6 of the cable raceway element. Assuming that this plane is a horizontal plane, a bend can also be produced in a vertical plane by cutting, between two transverse wires 4, sections of longitudinal wires 2 level with the rim 12 and the bottom 6 of the cable raceway element.

Note that the portions of the cable raceway element located on either side of the bend are connected by two longitudinal wires that have been bent through the angle corresponding to the angle of the required bend. Despite this bend, the cable raceway element therefore retains a high stiffness. Furthermore, note that virtually all orientations can be accommodated by a bend produced in the cable raceway element. Instead of cutting two facing longitudinal wires, it is possible to cut two adjacent longitudinal wires. In the cable raceway elements represented in FIGS. 1 to 6, a bend can then be produced with a change of plane.

FIG. 3 shows how two cable raceway elements are spliced. In the example represented, this splicing is effected with the aid of two CABLOFIL CE25-CE30 splicing plates. The person skilled in the art is familiar with this type of splicing. Briefly, two cable raceway elements are placed end to end so that an end transverse wire 4 of one cable raceway element faces an end transverse wire 4 of the other cable raceway element. The splicing plate then includes a first U-section portion 14 of relatively narrower width and a second U-section portion 16 of relatively greater width. The first portion 14 is positioned to overlap the two end transverse wires 4. The second portion 16 faces the first portion 14 so as to overlap on the one hand the end transverse wires 4 and on the other hand the branches of the first portion 14. A hole is provided in each of the portions 14 and 16. Once the latter have been positioned, they are retained by a nut and bolt 18. Two cable raceway elements of the invention are spliced in this way in an entirely conventional way. Of course, other existing splicing plates can also produce an equivalent splice.

FIG. 4 shows how a cable raceway of the invention is fixed to a floor, a ceiling, or a side wall.

FIG. 4 shows two similar accessories mounted in two different ways on the first lateral flange 8 of the cable raceway element. Each of these accessories is a CABLOFIL FTX fixing clip 20. FIG. 4 is an illustrative example, of course, and in practice a cable raceway element is not generally fitted with a fixing clip 20 on two adjacent transverse weft wires, with the clips mounted as represented in this figure. The purpose of this figure is merely to show how this kind of fixing clip 20 can be fitted to a cable raceway of the invention. The person skilled in the art knows how such accessories can be used to fix a cable raceway.

Without going into detail, the fixing clip 20 includes a groove 24 and a slot 26 perpendicular to the groove 24. On either side of the slot 26 is a lug 28. The fixing clip 20 is disposed at the intersection of a longitudinal warp wire 2 with a transverse weft wire 4. For a first fixing clip 20, the longitudinal warp wire 2 is accommodated in the groove 24 and the transverse weft wire 4 is positioned in the slot 26. For the second fixing clip 20, the transverse weft wire 4 is accommodated in the groove 24 and the longitudinal warp wire 2 is positioned in the slot 26. The fixing clip 20 is then pressed against a surface (floor, wall or ceiling) and fixed, for example by means of two screws passing through the lugs 28. Depending on the type of wall and the required mounting, the fixing clip 20 is fitted level with the rim 12, the first lateral wall 8 or the bottom 6 of a cable raceway element, less frequently level with a second lateral flange 10. Note here that if a cable raceway element of the invention is fixed to a wall, that element is pressed against the wall because, in particular, the longitudinal wires 2 are inside the transverse wires 4.

FIG. 5 shows how a cable raceway element of the invention can be fitted with a suspension member 22 so that it can thereafter be suspended from a ceiling. The suspension member 22 is a CABLOFIL SAS suspension member, for example. This suspension member 22 is preferably positioned on the rim 12 of a cable raceway element. It is conventionally used in combination with a threaded rod (not shown) fixed into a ceiling. Note in FIG. 5 that the suspension member 22 takes the form of a plate featuring an elongate hole 30 and two hooks 32 forming projections on one face of the plate of the suspension member 22. The hooks 32 are spaced relative to each other by a distance corresponding to the pitch separating the transverse wires 4.

Accordingly, two successive transverse wires 4 are accommodated in the two hooks 32 and the suspension member 22 as a whole is fixed, for example by means of a nut, not shown, to the threaded rod hanging down from the ceiling. The rod passes through the elongate hole 30 in the suspension member 22.

FIG. 6 shows another way of fixing a cable raceway element of the invention. In this figure, the cable raceway element is represented on a CABLOFIL UC35 cradle 34. Here this kind of cradle 34 can be used to fix a cable raceway to a ceiling or along a lateral partition such as a wall. The cradle 34 has the shape of a stirrup having a base 36 and two flanges 38. Each flange carries at its free end a fixing tongue 40. Each of these tongues (not described in detail here) can be clipped onto a wire, in particular a longitudinal wire 2 of a cable raceway element. FIG. 6 suggests mounting the cable raceway element in an "inclined" fashion. Thus the longitudinal wires 2 of the cable raceway element fixed to the bottom 6 and the first lateral flange 8 of this element are clipped onto the flanges 38 of the cradle 34. In this way, when the base 36 of the cradle 34 is fixed to a ceiling, cables can be introduced into the cable raceway of the invention from above. The base 36 of the cradle 34 can equally be fixed to a vertical partition such as a wall or to a ceiling. In these latter cases, the cable raceway of the invention has a lateral opening for introducing and where appropriate removing cables.

FIGS. 7 and 8 show from the front two embodiments of a cable raceway element of globally rectangular section. The cable raceway element represented in FIG. 7 features a wide opening while that from FIG. 8 features a smaller opening. In both cases there is a bottom 6, a first lateral flange 8, a second lateral flange 10 lower than the first lateral flange 8, and a rim 12 narrower than the bottom 6. The cable raceways represented in FIGS. 7 and 8 include one longitudinal warp wire 2 per face of the cable raceway. There are therefore four longitudinal warp wires 2. The warp wire on the rim 12 connects the free ends of the transverse weft wires 4 flanking the access opening of the cable raceway element. Similarly, the longitudinal warp wire 2 of the second lateral flange 10 connects the free ends of the transverse weft wires 4 of the other side of the opening of the cable raceway element.

Note that for both the FIG. 7 and FIG. 8 embodiments, the bottom 6 of the cable raceway element represented includes a longitudinal warp wire 2 facing the longitudinal warp wire 2 of the rim 12. These two longitudinal warp wires 2 are therefore in a plane substantially parallel to the flanges of the cable raceway element. In this embodiment, this plane is not a median plane of the cable raceway element.

FIG. 9 shows by way of example a different embodiment in which the transverse weft wires of a cable raceway element of the invention have a globally octagonal shape. In this case, each transverse weft wire 4 has eight sides, and because of this the corresponding cable raceway element has eight longitudinal faces. In the embodiment represented, the cable raceway element includes eight longitudinal warp wires 2, one longitudinal warp wire 2 per longitudinal face of the cable raceway element. An opening 42 at one corner of the octagon in each of the transverse weft wires 4 provides access to the interior of the cable raceway. Note that here there is a longitudinal weft wire 2 at each of the two edges of the opening 42. The longitudinal warp wires 2 face each other in pairs. In a different embodiment, again with transverse weft wires of octagonal profile, there could be a different number of longitudinal warp wires 2. There could be four or six longitudinal wires, for example.

As is clear from the foregoing description, the cable raceways described each have a simple structure but offer many advantages. They are very easy to use in particular. Such cable raceways elements can be bent easily and elements bent in this way retain a high stiffness. Furthermore, thanks in particular to the fact that the longitudinal wires 2 are inside the transverse wires 4, fixing the cable raceway elements is facilitated. Such elements can be pressed against a wall by standard prior art fixing devices. Unlike most other prior art G-section cable raceways, there is no utility here in providing dedicated accessories either for splicing cable raceway elements or for fixing them to a support.

The square embodiment (although a rectangular shape can also be envisaged) is particularly well suited to small cable raceways, in particular cable raceways intended for home use. Such cable raceways can be used to receive the numerous electrical cables that are found in some places in the home to avoid such cables trailing over the floor or hanging along a wall or under a ceiling. The ease of using and fitting this cable raceway makes it an accessory perfectly suitable for use in the home.

The present invention is not limited to the preferred embodiment described hereinabove by way of nonlimiting example. It relates equally to different embodiments that will be evident to the person skilled in is the art falling within the scope of the following claims.

The invention claimed is:

1. Wire cable raceway element comprising:
   substantially rectilinear longitudinal warp wires (2); and
   polygonal transverse weft wires (4) having an opening at one corner and an even number of at least four sides;
   wherein each of said longitudinal warp wires (2) is carried by a different one of said at least four sides (6, 8, 10, 12) of the transverse weft wires, each of said at least four sides carrying only one of said longitudinal warp wires,
   wherein for each of said longitudinal warp wires (2) there corresponds one of said longitudinal warp wires (2) on an opposite one of said at least four sides, each pair of said longitudinal warp wires (2) on opposite ones of said at least four sides being disposed face to face in a same plane substantially parallel to one of plural longitudinal faces of the cable raceway element, and
   wherein the longitudinal warp wires (2) are inside the transverse weft wires (4).

2. Wire cable raceway element according to claim 1, wherein respective ones of said longitudinal warp wires are disposed on each of the longitudinal faces of the cable raceway element.

3. Wire cable raceway element according to claim 2, wherein the longitudinal warp wires (2) lie in median longitudinal planes of the cable raceway element.

4. Wire cable raceway element according to claim 2, wherein one of the longitudinal warp wires (2) joins free ends of the transverse weft wires (4) corresponding to one edge of the opening produced therein.

5. Wire cable raceway element according to claim 2, wherein the raceway element has a substantially rectangular cross section.

6. Wire cable raceway element according to claim 1, wherein the longitudinal warp wires (2) lie in median longitudinal planes of the cable raceway element.

7. Wire cable raceway element according to claim 6, wherein one of the longitudinal warp wires (2) joins free ends of the transverse weft wires (4) corresponding to one edge of the opening produced therein.

8. Wire cable raceway element according to claim 6, wherein the raceway element has a substantially rectangular cross section.

9. Wire cable raceway element according to claim 1, wherein one of the longitudinal warp wires (2) joins free ends of the transverse weft wires (4) corresponding to one edge of the opening produced therein.

10. Wire cable raceway element according to claim 9, wherein the raceway element has a substantially rectangular cross section.

11. Wire cable raceway element according to claim 1, wherein the raceway element has a substantially rectangular cross section.

12. Wire cable raceway element according to claim 11, wherein said transverse weft wires (4) have said at least four sides to which correspond four longitudinal faces of the cable raceway element, the four longitudinal faces being a bottom (6), a first lateral flange (8) attached to a first longitudinal edge of the bottom (6), an upper rim (12) narrower than and substantially parallel to the bottom (6) extending from an edge of the first lateral flange (8) opposite the bottom (6), and a second lateral flange (10) lower than and substantially parallel to the first lateral flange (8) and extending from an edge of the bottom (6) opposite the first lateral flange (8).

13. Wire cable raceway element according to claim 12, wherein a height of the second lateral flange (10) substantially corresponds to half a height of the first lateral flange (8), and a width of the upper rim (12) corresponds substantially to half a width of the bottom (6) of the cable raceway element.

14. Wire cable raceway element according to claim 1, wherein the raceway element has a substantially square cross section.

15. Wire cable raceway element comprising:
longitudinal warp wires; and
polygonal transverse weft wires having an opening at one corner and an even number of at least four sides;
wherein each of said longitudinal warp wires is carried by a different one of said at least four sides of the transverse weft wires, each of said at least four sides carrying only one of said longitudinal warp wires,
wherein all of said longitudinal warp wires in the wire cable raceway element have a corresponding one of said longitudinal warp wires on an opposite side, each pair of said longitudinal warp wires (2) on opposite ones of said at least four sides being disposed face to face in a same plane substantially parallel to one of plural longitudinal faces of the cable raceway element, there being none of said longitudinal warp wires in the wire cable raceway element that do not have one of said longitudinal warp wires on the opposite one of said at least four sides, and
wherein the longitudinal warp wires (2) are inside the transverse weft wires (4).

* * * * *